United States Patent
Eberspach

(10) Patent No.: US 7,334,544 B2
(45) Date of Patent: Feb. 26, 2008

(54) VEHICLE TEMPERATURE CONTROL SYSTEM

(75) Inventor: Günter Eberspach, Wolfschlugen (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 406 days.

(21) Appl. No.: 11/051,783

(22) Filed: Feb. 4, 2005

(65) Prior Publication Data
US 2006/0202046 A1 Sep. 14, 2006

(30) Foreign Application Priority Data
Feb. 6, 2004 (DE) .................. 10 2004 006 008

(51) Int. Cl.
*F01P 7/14* (2006.01)
(52) U.S. Cl. .............. 123/41.1; 123/142.5 E; 123/179.7; 123/366; 123/41.52
(58) Field of Classification Search .............. 123/41.1, 123/142.5 E, 142.5 R, 179.7, 179.8, 179.14, 123/179.15, 179.16, 179.19, 179.28, 41.52, 123/366
See application file for complete search history.

(56) References Cited

U.S. PATENT DOCUMENTS

| | | | | |
|---|---|---|---|---|
| 5,419,287 | A * | 5/1995 | Evans | ...... 123/41.29 |
| 5,505,164 | A * | 4/1996 | Hollis | ...... 123/41.1 |
| 2001/0042740 | A1 | 11/2001 | Ballem et al. | |
| 2002/0100290 | A1 * | 8/2002 | Herta et al. | ...... 62/434 |
| 2006/0157002 | A1 * | 7/2006 | Pfeffinger et al. | ...... 123/41.29 |

FOREIGN PATENT DOCUMENTS

| | | |
|---|---|---|
| DE | 29 16 216 A1 | 11/1980 |
| DE | 40 32 701 A1 | 10/1990 |
| DE | 41 05 199 A1 | 2/1991 |
| DE | 41 05 199 A1 | 8/1992 |
| DE | 42 14 850 A1 | 11/1993 |
| DE | 195 25 661 A1 | 1/1997 |
| DE | 100 24 448 C1 | 5/2000 |
| EP | 1 172 538 A2 | 1/2002 |
| EP | 1 249 588 A2 | 10/2002 |
| EP | 1 270 935 A2 | 1/2003 |
| JP | 59043967 | 3/1984 |

\* cited by examiner

*Primary Examiner*—Mahmoud Gimie
*Assistant Examiner*—Katrina B. Harris

(57) ABSTRACT

A vehicle temperature control system comprising an internal combustion engine with an engine block and with a cylinder head, a heat source for heating a heat transfer medium, a heat exchanger arrangement for the transfer of heat transported in the heat transfer medium to air to be introduced into a vehicle interior, and a valve arrangement, by means of which the heat transfer medium heated by the heat source can be fed selectively, at least in part, to a first heat transfer region, provided in the region of the cylinder head, of the internal combustion engine, without being conducted into a second heat transfer region, provided in the region of the engine block, of the internal combustion engine.

13 Claims, 2 Drawing Sheets

VEHICLE TEMPERATURE CONTROL SYSTEM

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

BACKGROUND OF THE INVENTION

1. Field of the Invention

The present invention relates to a vehicle temperature control system, which comprises an internal combustion engine with an engine block and with a cylinder head, and a heat source for heating a heat transfer medium, and to a method for operating a vehicle temperature control system of this type, in particular in a starting phase of the internal combustion engine or in a preheating phase preceding the starting phase of the internal combustion engine.

2. Description of Related Art Including Information Disclosed Under 37 CFR 1.97 and 1.98

In vehicle temperature control systems of this type, in which a heat transfer medium, generally a liquid, such as, for example, water, can be heated by the heat source in addition to the heat occurring in the internal combustion engine during the operation of the latter, various requirements have to be fulfilled during operation. On the one hand, a system of this type is to be operated in such a way that, when a vehicle begins to be used, there are for the driver agreeable ambient conditions, that is to say, for example, agreeable interior temperatures, defrosted windshields and the like. On the other hand, there are also increasingly more stringent statutory requirements to be met by the exhaust gas emission, particularly in the starting phase. Adhering to the statutory requirements becomes more difficult particularly for diesel internal combustion engines which deliver ever higher performances and torques. Thus, it is known, for pollutant emission in the starting phase, to conduct the heat provided in the heat source and transferred to the heat transfer medium primarily in the direction of the internal combustion engine, in order to heat the latter as quickly as possible to operating temperature or toward operating temperature and thereby make the cold-running phase with comparatively high pollutant emission as short as possible.

BRIEF SUMMARY OF THE INVENTION

The object of the present invention is to provide a vehicle temperature control system and a method for operating this, in which the requirements as to as low pollutant emission as possible in the starting phase of the internal combustion engine, on the one hand, and as to as high a degree of comfort as possible for the person using a vehicle, on the other hand, are fulfilled in an improved way.

According to a first aspect, this object is achieved by means of vehicle temperature control system, comprising:
  an internal combustion engine with an engine block and with a cylinder head,
  a heat source for heating a heat transfer medium,
  a heat exchanger arrangement for the transfer of heat transported in the heat transfer medium to air to be introduced into a vehicle interior,
  a valve arrangement, by means of which the heat transfer medium heated by the heat source can be fed selectively, at least in part, to a first heat transfer region, provided in the region of the cylinder head, of the internal combustion engine, without being conducted into a second heat transfer region, provided in the region of the engine block, of the internal combustion engine.

In the vehicle temperature control system according to the invention, therefore, there is the possibility of using the heat provided in the heat source for the preferred heating of the cylinder head, without, in this state, first also coheating or to a substantial extent coheating the engine block. The heat provided in the heat source or at least a part or a substantial part thereof can thereby be activated efficiently in that region of the internal combustion engine, the heating of which is of maximum importance in the starting phase of the internal combustion engine in terms of the reduction in pollutant emissions. Since the cylinder head is that region of the internal combustion engine in which fuel introduction or fuel injection generally takes place and, primarily, also the ignition and combustion of the fuel take place, the cold-running phase having the disadvantage of high pollutant emissions can be markedly shortened by this region of the internal combustion engine being heated as quickly as possible and primarily. At the same time, since the engine block does not also have to be coheated to a substantial extent, at least in this phase, there is the possibility, by the heat transfer medium or a part thereof being conducted in the direction of the heat exchanger arrangement, of utilizing part of the heat provided in the heat source for heating the air to be introduced into the vehicle interior and therefore already obtaining some heating of the vehicle interior even in the starting phase of the internal combustion engine.

So that a very high variability can be achieved in a utilization of the heat provided in the heat source and, of course, also of the heat generated in the internal combustion engine during the combustion operation of the latter, it is proposed that the valve arrangement comprise a first valve which is designed for selectively making a flow connection between
  the heat source and the heat exchanger arrangement and/or
  the heat source and the first heat transfer region and/or
  the heat exchanger arrangement and the first heat transfer region.

So that the incorporation of the second heat transfer region, that is to say essentially the engine block, into the heating circuit can be obtained, it is proposed that the valve arrangement comprise a second valve which is designed for selectively making a flow connection between the first heat transfer region and the second heat transfer region.

Alternatively or additionally to the provision of this second valve between the first heat transfer region and the second heat transfer region, the incorporation of the second heat transfer region into the temperature control circuit can be obtained in that the first valve is designed for selectively making a flow connection between the second heat transfer region and the heat source.

Furthermore, the first valve may be designed for making a flow connection between

- the second heat transfer region and the first heat transfer region and/or
- the second heat transfer region and the heat exchanger arrangement.

So that, in the starting phase of the internal combustion engine, the heat occurring in the cylinder head when combustion is then already taking place is also as far as possible held in this region, but a small fraction of the heat transfer medium is nevertheless also already coheated, it is further proposed that the valve arrangement be designed to provide a flow circuit comprising essentially only the first heat transfer region and a feed pump.

The heat source of the vehicle temperature control system according to the invention may comprise, for example, a heating appliance preferably operated with fossil fuel. A heating appliance of this type may be provided, for example, as auxiliary heating or an additional heater and generally be operated with the same fuel as the internal combustion engine. Alternatively or additionally, a fuel cell system may also be provided, which, on the one hand, generates electricity as a result of the reaction of hydrogen and atmospheric oxygen and, on the other hand, also provides heat during this reaction. This heat, too, can then be utilized in the system according to the invention. With regard to this fuel cell system, for example, a reformer may also be provided, which provides a hydrogen-containing gas from fossil fuel. Even during the reforming process which in this case takes place, heat occurs which can be utilized in the temperature control system according to the invention.

Above all when a vehicle has provided in it an additional energy source, such as, for example, a fuel cell, by means of which electrical energy can be provided, without substantially loading the on-board voltage system, that is to say, for example, a battery, an electrically operable heating device may further be provided, by means of which heat can be supplied to the heat transfer medium and/or to the air to be introduced into the vehicle interior. In this way, in the starting phase and, if appropriate, also in a preheating phase, not only can the heat occurring in the fuel cell system be utilized, but the electrical energy generated can additionally also be used for heating the heat transfer medium and/or the air to be introduced into the vehicle interior.

In the vehicle temperature control system according to the invention, there may be further provision for the valve arrangement to be designed to influence, in terms of flow quantity, at least part of the flow connections capable of being made by this valve arrangement. That is to say, the valve arrangement is not only designed to clear or interrupt various flow paths or all possible flow paths or flow connections, but also to influence the extent of the flow, so that the transition between various flow states and flow circuits can be obtained more or less continuously. It is thereby possible, for example, to avoid spontaneous temperature drops of the heat transfer medium and therefore also of the various system regions fed with it when other system regions with a still comparatively low temperature are connected into the heating circuit.

According to a further aspect of the present invention, the object initially mentioned is achieved by means of a method for operating a vehicle temperature control system according to the invention, in which method, in a starting phase of the internal combustion engine, the heat source is operated in order to supply heat to the heat transfer medium and, in a first portion of the starting phase, the heat transfer medium heated by the heat source is fed essentially only to the first heat transfer region or the second heat transfer region.

As already explained above, it is particularly advantageous, for as rapid a reduction as possible of the pollutant emission in the starting phase, first to heat to an increased extent that region in which combustion takes place and therefore also pollutant is generated. Alternatively, the preferred heating may take place where this is particularly advantageous for frictional reasons, that is to say in the region of the engine block.

In the method according to the invention, there may be further provision, when the temperature in the region of the first heat transfer region reaches a first predetermined temperature, for there to be formed, in a second portion of the starting phase, a flow circuit comprising essentially only the first heat transfer region and a feed pump. It consequently becomes possible for the first heat transfer region and consequently the cylinder head to be decoupled essentially from the remaining temperature control circuit when there is in the region of the cylinder head a specific temperature which may, for example, be around 25° C., and a certain extent of pollutant reduction is therefore already achieved. The heat then generated in the region of the cylinder head when combustion is taking place is thus also held primarily in the region of the cylinder head and utilized for the additional heating of the latter. Nevertheless, as a result of the formation of this very small circuit, the heat transfer medium which is still circulating in it and cannot in this phase arrive at the heat source is coheated. If, in the course of this heating of the cylinder head, the temperature in the region of the first heat transfer region then reaches a second predetermined temperature, which may therefore be in the range of the normal operating temperature at about 90° C. to 100° C., the second heat transfer region may also be connected into this small flow circuit which first comprised essentially only the first heat transfer region in the feed pump. The heat transfer medium then circulating in the region of this circuit transfers heat from the cylinder head, that is to say from the first heat transfer region, to the engine block, that is to say the second heat transfer region, so that an increase in the temperature of the engine block can be obtained in this phase, without additional heat from the heat source having to be demanded.

Further, in the method according to the invention, there may be provision, in the second portion of the starting phase, for the heat transfer medium heated in the heat source to be fed to the second heat transfer region and/or to the heat exchanger arrangement and/or, in the third portion of the starting phase, for the heat transfer medium heated in the heat source to be fed essentially only to the heat exchanger arrangement.

According to a further aspect of the present invention, the object initially mentioned is achieved by means of a method for operating a vehicle temperature control system according to the invention, in which method, in a starting phase of the internal combustion engine, the heat source is operated in order to supply heat to the heat transfer medium, and, in a first portion of the starting phase, the heat transfer medium heated in the heat source is conducted essentially to the heat exchanger arrangement.

In this method according to the invention, therefore, preference is given to the conditioning of the vehicle or of the vehicle interior, in that the heat provided in the heat source is utilized primarily or, if appropriate, even exclusively for heating the air to be introduced into the vehicle interior.

When a specific conditioning state is then reached, which may be defined, for example, by the temperature in the vehicle interior, by the misting of the window panes or the like, then, in a second portion of the starting phase, at least part of the heat transfer medium heated in the heated source can be fed to the first heat transfer region and/or the second heat transfer region.

It may also be pointed out, here, that the transition between the various portions of the starting phase must, of course, not take place abruptly. A gradual variation in the flow direction of the heat transfer medium by means of a corresponding adjustment of the valve arrangement and, if appropriate, also an increased or reduced operation of various feed pumps may be provided, in order to avoid the spontaneous temperature changes already referred to above.

According to a further aspect of the present invention, the object initially mentioned is achieved by means of a method for operating a vehicle temperature control system according to the invention, in which method, before a starting phase of the internal combustion engine, the heat source is operated in a preheating phase, in order to supply heat to the heat transfer medium, and, in a first portion of the preheating phase, the heat transfer medium heated in the heat source is conducted essentially to the heat exchanger arrangement.

What is achieved by means of this method, therefore, is that, even before a vehicle begins to be used, and therefore also before the starting phase of the internal combustion engine, some conditioning or preconditioning of the vehicle or of the interior takes place, so that, for example, a desired temperature is reached and/or the vehicle windows are defrosted or freed of moisture misting.

When, here too, a specific conditioning state is then obtained, in a second portion of the preheating phase, at least part of the heat transfer medium heated in the heat source can be conducted to the first heat transfer region and/or to the second heat transfer region.

BRIEF DESCRIPTION OF THE SEVERAL
VIEWS OF THE DRAWINGS

The present invention is described in detail below with reference to the accompanying drawings in which.

DETAILED DESCRIPTION OF THE
INVENTION

Figure 1:
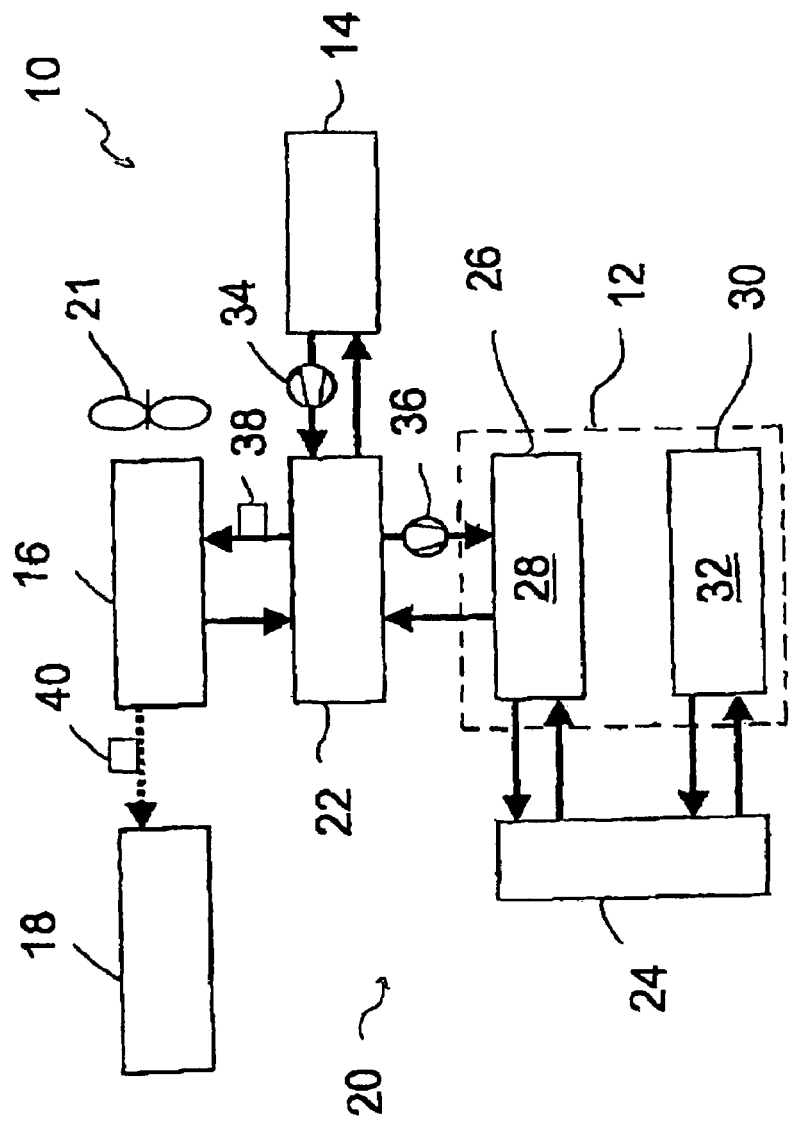
FIG. 1 shows an illustration of a vehicle temperature control system according to the invention in the form of a block diagram.

In FIG. 1, a vehicle temperature control system is designated in general by 10. This vehicle temperature control system comprises, as essential system region, a diagrammatically indicated internal combustion engine 12, which, in a starting phase of the latter, is to be considered basically as a heat sink, but, in normal operation, can provide heat which is utilized in other system regions. Furthermore, the vehicle temperature control system 10 comprises a heat source 14. This heat source 14 may comprise, for example, a heating appliance which is operated with the same fuel as the internal combustion engine 12 and which may be designed as what is known as auxiliary heating or an additional heater. During the combustion which then takes place in this heating appliance, heat is generated, which is then transferred to a heat transfer medium, that is to say, for example, water. This heat source 14 may, however, also comprise a fuel cell system which is provided basically for providing electrical energy. A fuel cell system of this type comprises a fuel cell, in which hydrogen is reacted with oxygen contained in the air to form water, in order in this case to generate electrical energy. In this reaction process, however, heat is also released, which can be transferred to the heat transfer medium. Furthermore, a fuel cell system of this type may have a reformer, in which a hydrogen-containing gas is provided from hydrocarbon, that is to say, for example, likewise fossil fuel, in a reforming process. In this reforming process, heat is likewise released which may likewise be utilized for heating the heat transfer medium.

The vehicle temperature control system 10 comprises, furthermore, a heat exchanger arrangement 16, in which heat can be transferred to the air which is to be introduced into a vehicle interior 18 and which is delivered by a blower 21.

So that the flow of the heat transfer medium can be conducted between the various system regions 12, 14 and 16 in a defined way, a valve arrangement, designated in general by 20, is provided. In the variant illustrated in FIG. 1, this valve arrangement 20 comprises a first valve 22 which is basically capable of setting the flow connection between the heat source 14, the internal combustion engine 12 and the heat exchanger arrangement 16.

Furthermore, the valve arrangement 20 comprises a second valve 24 which is provided essentially for influencing the flow connection between a first heat transfer region 28, provided in the region of the cylinder head 26 of the internal combustion engine, and a second heat transfer region 32, provided in the region of an engine block 30 of the internal combustion engine 12. In a particularly preferred embodiment of the vehicle temperature control system 10, the two valves 22, 24 or at least one of these are or is designed in such a way that the various implementable flow connections can not only be cleared completely or interrupted completely, but a variation of the flow quantity may also be provided, in order, for example, starting from a completely interrupted state of a specific flow path, to clear the latter gradually and thus to increase the quantity of heat transfer medium flowing through this flow path gradually, for example up to the maximum extent.

So that the circulation of the heat transfer medium can be obtained, in the variant of the vehicle temperature control system 10 illustrated in FIG. 1, a first feed pump 34 is provided, which basically ensures that the heat transfer medium flows through the heat source 14 or can pass from the heat source 14 into the various other system regions. Furthermore, a second feed pump 36 is provided, which is active essentially in the connection region between the first valve 22 and the first heat transfer region 28, that is to say the cylinder head 26 of the internal combustion engine 12, and the function of which is also described below.

Furthermore, an electrically operable heating element 38 can be seen in the system illustrated in FIG. 1, in the connecting path between the first valve 22 and the heat exchanger arrangement 16. An electrically operable heating element 40 of this type is also provided in the connecting path between the heat exchanger arrangement 16 and the vehicle interior 18, that is to say the region in which the air to be introduced into the vehicle interior 18 flows. Above all in the embodiment of the heat source as a fuel cell system, the electrical energy generated during the reaction of hydrogen with oxygen which takes place can be utilized in order to excite heating elements 38 and 40 of this type. Thus, further heat, in addition to the heat already provided in the heat source 14, can also be supplied, on the one hand, to the heat transfer medium and, on the other hand, to the air to be introduced into the vehicle interior. It may be pointed out that, of course, even only one of the two heating elements 38, 40 may be provided or the heating element 38 serving for the additional heating of the heat transfer medium may also be positioned elsewhere.

Whereas, as already described above, the valve 24 serves essentially for clearing or interrupting the flow connection between the first heat transfer region 28 and the second heat transfer region 32 and therefore basically also has the function of incorporating the engine block 30 into the overall temperature control circuit or of decoupling it from this, the essential task of the first valve 22 is to conduct the flow of the heat transfer medium heated in the heat source 14 in such a way that the heat transported in said heat transfer medium can be utilized at the desired point. For this purpose, preferably, the first valve 22 is designed in such a way that it is capable of making a flow connection between the heat source 14 and the heat exchanger arrangement 16 and in this case, for example, of interrupting to flow connection to the internal combustion engine 12. Furthermore, for this purpose, the valve 22 is to be capable of making a flow connection between the heat source 14 and the internal combustion engine 12 when the flow connection to the heat exchanger arrangement 16 is interrupted. Of course, the possibility is also to be afforded of making a flow connection between the internal combustion engine 12 and the heat exchanger arrangement 16, while, in this phase, the heat source 14 can then be decoupled from the circuit. In this phase, for example, the feed pump 36 can then be utilized to drive the heat transfer medium in circulation. The first valve 22 should also be capable of decoupling the internal combustion engine 12, that is to say the first heat transfer region 28, from the remaining part of the circuit, that is to say decoupling it from the heat source 14 and the heat exchanger arrangement 16, in such a way that, for example when the second valve 24 does not make any connection between the two heat transfer regions 28 and 32, a small flow circuit is formed, in which a small fraction of the heat transfer medium, driven by the feed pump 36, flows through the first heat transfer region 28 and the flow lines coupling the latter to the first valve 22 and, of course, also through the corresponding flow path in the first valve 22. By the second valve 24 being changed over, the engine block 30 or the second heat transfer region 32 can then additionally also be incorporated into this flow circuit which, however, is otherwise decoupled from the heat source 14 and also the heat exchanger arrangement 16.

It may be pointed out, once again, that the valve arrangement 20 and its two valves 22, 24 which can be seen in FIG. 1 may be designed in such a way that, in the case of the various possibilities of actuation referred to above, not only is a complete decoupling or coupling of the various system regions possible, but, for example when a primary coupling is basically implemented between the heat source 14 and the heat exchanger arrangement 16 via the first valve 22, a certain fraction of the heat transfer medium heated in the heat source 14 can also flow in the direction of the internal combustion engine 12. It may be pointed out, further, that not necessarily all the possibilities of actuation described above have to be implemented in a system. This will depend on the respective requirements. It may also be pointed out that the valve arrangement 20 and its two valves 22, 24 do not have to be provided as a single subassembly or structural unit. Thus, of course, each of these valves 22, 24 may be composed of a plurality of individual valve units which can then in each case be actuated by means of an activation device, not illustrated, in such a way that the desired flow paths are obtained.

Before the types of operation possible with the temperature control system according to the invention are discussed, an alternative variant of a temperature control system 10 of this type is described below with reference to FIG. 2. In this case, essentially only the differences which exist in comparison with the variant of FIG. 1 are dealt with.

Figure 2:
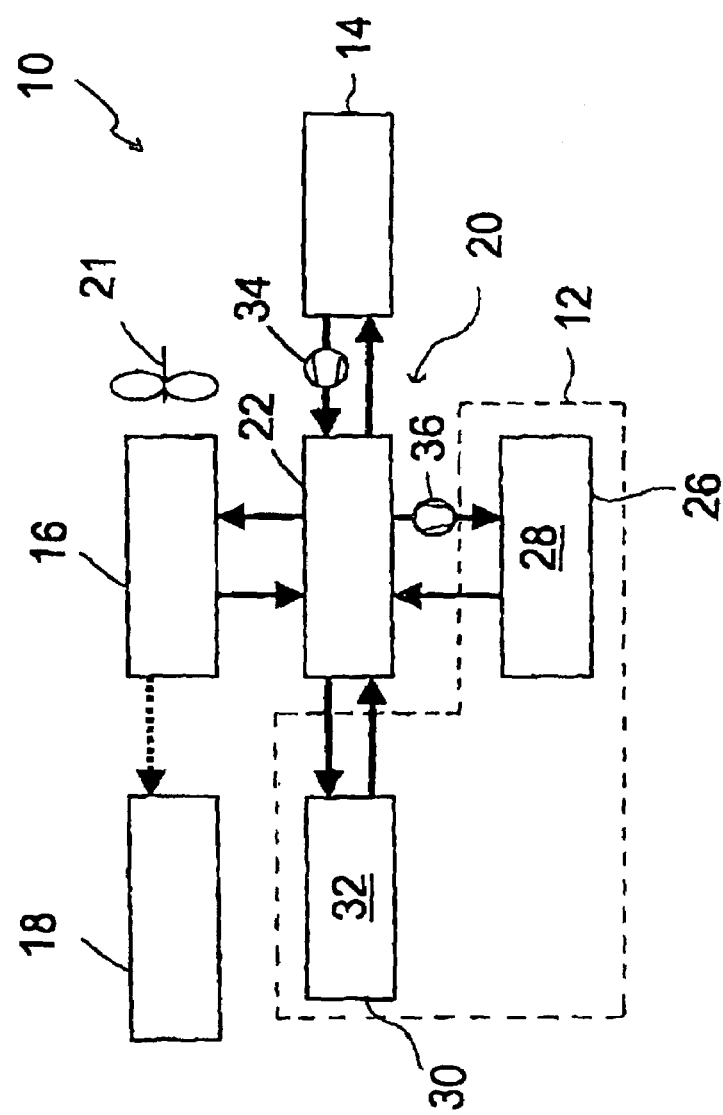
FIG. 2 shows an illustration, corresponding to FIG. 1, to an alternative embodiment of a vehicle temperature control system.

In the variant illustrated in FIG. 2, the essential difference is that the valve arrangement 20 comprises only the valve 22 designated above as the first valve. This valve 22 is in this case also capable of connecting the second heat transfer region 32, that is to say the engine block 30, in the desired way to the other system regions, that is to say the heat source 14, the first heat transfer region 28 and the heat exchanger arrangement 16. This valve 22, too, is preferably designed in such a way that it can make any desired connections between two, three or all four system regions 14, 16, 28 and 32. This therefore also refers to a direct connection of the first heat transfer region 28 to the second heat transfer region 32, so that the small flow circuit referred to above, otherwise, for example, decoupled completely from the heat source 14 and the heat exchanger arrangement 16, can be implemented. In contrast to the design variant illustrated in FIG. 1, however, in the variant shown in FIG. 2, the second heat transfer region 32, that is to say the engine block 30, can also be flow-connected directly to the heat source 14 and/or the heat exchanger arrangement 16, without the first heat transfer region 28 being incorporated into this circuit.

It goes without saying that, in the variant shown in FIG. 2, too, the electrically operable heating elements described above may be provided. In principle, it is also conceivable, in this variant shown in FIG. 2, to implement a direct flow connection between the two heat transfer regions 28, 32 by the provision of the second valve 24 which can also be seen in FIG. 1.

Various possibilities are described below whereby the vehicle temperature control systems 10 shown in FIGS. 1 and 2 can be operated, so that, above all in or even before a starting phase of the internal combustion engine 12, desired thermal states can be obtained in various system regions, hence, in particular, in the region of the internal combustion engine 12 and of the vehicle interior 18.

A situation may first be assumed where a vehicle having a vehicle temperature control system 10 of this type is put into operation by a driver at comparatively low ambient temperatures. When the internal combustion engine 12 is started in this state, therefore, the heat source 14, that is to say, for example, a heating appliance, is also put into operation. Above all in the case of heating appliances starting quickly, this is capable, within the comparatively short duration of up to 25 seconds, of providing the maximum heating power, which may lie, for example, in the region of 5 kW, and of correspondingly heating the heat transfer medium flowing through this heat source 14. If, in this starting phase of the internal combustion engine 12, preference is given to reducing the pollutant emission, which will in future increasingly be the case owing to the statutory required emission values, then, by means of the valve arrangement 20, the heat transfer medium which has absorbed heat in the heat source 14 can first be conducted primarily or even exclusively to the first heat transfer region 28, that is to say to the cylinder head 26. In the design variant of FIG. 1, therefore, in this state, only the flow connection between the heat source 14 and the first heat transfer region 28 would be cleared. The heat exchanger arrangement 16 would be decoupled completely. The second heat transfer region 32 would be decoupled completely as a result of the corresponding actuation of the second valve 24. In the variant shown in FIG. 2, the single valve 22 would provide only a flow connection between the heat source 14 and the first heat transfer region 26. In this state, the circulation of the heat transfer medium can be obtained solely by the operation of the feed pump 34.

Since, in this first portion of the starting phase, essentially the entire heat energy provided in the region of the heat source 14 is utilized to heat the cylinder head 28, the latter will become hot comparatively quickly and, for example, reach a first temperature threshold in the region of about 25° C. Heating to such a temperature leads even in a comparatively short time to a marked reduction in pollutant emissions, in particular CO and HC emissions, since, above all, that region is heated in which pollutant-generating combustion takes place in the internal combustion engine.

Since, in this first portion of the starting phase, the engine block 30 is preferably decoupled completely from the thermal circuit, with a corresponding heating power of the heat source 14, and also taking into account the ambient temperatures and therefore the energy required for heating the cylinder head 26, part of the heated heat transfer medium can already also be conducted in the direction of the heat exchanger arrangement 16, in order, also in the starting phase or the first portion of the starting phase, already to obtain a heating of the air to be introduced into the vehicle interior 18. If, however, the entire heat energy provided in the heat source 14 is required in order to bring the cylinder head 26 to the desired temperature, for example in the region of 25° C., in an acceptable time, then, as already stated, the heat transfer medium heated in the heat source 14 can be conducted solely in the direction of the first heat transfer region 28.

When the cylinder head 26 is then at this desired temperature, which, however, may still lie markedly below the operating temperature, the first heat transfer region 28 can then be decoupled from the heat source 14 or else from the heat exchanger 16 by means of a corresponding activation of the valve arrangement 20. The small flow circuit already referred to is thus provided, in which part of the heat transfer medium, driven by the feed pump 36, circulates between the first heat transfer region 28 and the valve 22. In this phase, the heat transferred to the heat transfer medium in the heat source 14 can then be utilized, as a result of the conduction of the heat transfer medium essentially to the heat exchanger arrangement 16, in order to heat to an increased extent the air to be introduced into the vehicle interior. In the variant illustrated in FIG. 2, it would basically also be possible, in this second portion of the starting phase, also to conduct at least part of the heat transfer medium heated in the heat source 14 in the direction of the second heat transfer region 32 and consequently already start a preheating of the engine block 30.

In this second portion of the starting phase, the decoupling of the first heat transfer region 28 from the other system regions 14, 16, 30 providing heat or absorbing heat ensures that the heat occurring when combustion is taking place in the internal combustion engine 12 is held essentially in the region of the cylinder head 26 or of the heat transfer medium circulating in the latter and this cylinder head 26 is thus heated further to an increased extent. This phase may last until the cylinder head 26 is then in the region of its operating temperature of about 90° C. to 100° C. A transition can then be made to a third portion of the starting phase, in which the cylinder block 30 or the second heat transfer region 32 is then connected into the flow circuit which initially comprises only essentially the first heat transfer region 28 and the associated connecting lines to the valve 22. In the embodiment according to FIG. 1, for this purpose, the second valve 24 would be activated in such a way that a connection between the two heat transfer regions 28, 32 is then present or occurs gradually, so that, by a gradual rise in the heat transfer medium stream between the first heat transfer region 28 and the second heat transfer region 32, a spontaneous temperature drop can be avoided. In the variant of FIG. 2, this flow circuit can be obtained by the coupling of the two heat transfer regions 28, 32 via the valve 22. Here, too, the heat transfer medium stream is then driven as a result of the operation of the feed pump 36. The heat transfer medium then also circulating through the heat source 14 under the conveying action of the feed pump 34 can be conducted, for example, completely in the direction of the heat exchanger arrangement 16, in order thereby to heat to an increased extent the air to be introduced into the vehicle interior 18.

It can be seen from the above description that, in a transition from the first portion of the starting phase to the third portion of the starting phase, the procedure can be such that, with the best possible heating of the system regions relevant to the generation of pollutant emissions, that is to say, in particular, of the cylinder head 26 and then also of the engine block 30, even a heating of the vehicle interior 18 can nevertheless also take place to the extent which is still possible. All this may be assisted in that additionally, in various phases, the heating elements 38, 40 are also excited, above all when the heat source 14 comprises a fuel cell.

When the internal combustion engine 12 is then in its entirety essentially at the operating temperature, it is basically capable of providing the heat then still required in the vehicle, that is to say also the heat required for heating the interior 18, without assistance by the heat source 14, that is to say, after the third portion of the starting phase and, as it were, from the commencement of a normal operating phase, the heat source 14 could then be decoupled from the flow circuit and a connection between the internal combustion engine 12 and the heat exchanger arrangement 16 be made via the valve 22, in order to discharge heat from the region of the internal combustion engine 12 and transfer this, in the region of the heat exchanger 16, to the air to be introduced into the vehicle interior 18 or so that this heat can be discharged into the surroundings in the region of a further heat exchanger, not illustrated in the figures. In this state, because of the decoupling of the heat source 14 and therefore also of the feed pump 34, circulation can then be maintained by means of the operation of the feed pump 36.

In the procedure described above, therefore, preference is given to heating the internal combustion engine 12, in particular its cylinder head 26, as compared with the heating of the vehicle interior 18, in order thereby to lower the pollutant emission in the starting phase as quickly as possible. If, however, preference is given to the more rapid heating of the interior, then the procedure may be such that, first, in the first portion of the starting phase, the interior 18 is initially conditioned to the desired extent by means of the exclusive or primary conduction of the heat transfer medium to the heat exchanger arrangement 16. When a specific predetermined temperature or another conditioning state, such as, for example, the de-icing of the window panes or the like, is reached the heat transfer medium can then be conducted in the direction of the internal combustion engine 12, for example initially to the cylinder head 26 again. This transition, too, from the conduction of the heat transfer medium to the heat exchanger arrangement 16 to the conduction of the heat transfer medium to the internal combustion engine 12 can take place continuously, and there may also be provision for always at least a small fraction of the heat transfer medium to still go in the direction of the heat exchanger arrangement 16, even when the internal combustion engine 12 is then to be heated to an increased extent in a second portion of the starting phase. In this second portion, the procedure can then again be such that, first, the cylinder head 26 is heated, for example, exclusively or primarily, and then, when the latter is sufficiently hot, the engine block 30 is also additionally coheated by the heat transfer medium being fed to the second heat transfer region 32.

If the heat source 14 is such that it can be put into operation even before the internal combustion engine 12 is started, then a preconditioning of the vehicle interior 18 or of the internal combustion engine 12 can also take place even before the planned beginning of use of the internal combustion engine 12. If, for example, by virtue of a corresponding programming of a control apparatus for the heat source 14, it is known when the beginning of use is to take place, then, in a preceding preheating time period, the heat source 14 can be operated in order, for example, first to bring the vehicle interior 18 to the desired state by means of the exclusive or primary conduction of the heated heat transfer stream to the heat exchanger arrangement 16. When this state is reached, then, in a second portion of the preheating phase, hot heat transfer medium can be conducted in the direction of the internal combustion engine 12 exclusively or to an increased extent or increasingly. Here, too, there may be provision first for supplying heat transfer medium to the cylinder head 26 to an increased extent and then, when the latter has reached a specific temperature, for also heating the engine block 30 additionally or to an increased extent by the supply of heat transfer medium to the second heat transfer region 32.

The duration of the preheating phase may also be selected, taking into account the ambient temperature or the temperature in the various system regions of the temperature control system 10 according to the invention, in such a way that it is sufficiently long to obtain the desired preconditioning both in the region of the interior 18 and in the region of the internal combustion engine 12. When the internal combustion engine 12 is then put into operation and the starting phase is thus begun, for example, one of the above procedures can follow, which, in the starting phase, then ensure that a further lowering of the pollutant emission is obtained as quickly as possible as a result of a sufficiently high heating of the internal combustion engine 12.

In a further type of operation, the system according to the invention may be used in such a way that, for example, increased attention is not given to pollutant emission in the region of the internal combustion engine 12 in the starting phase, but, instead, to its tribological properties. Particularly during starting at comparatively low ambient temperatures, the friction occurring in the region of the components moving with respect to one another also becomes relatively high due to a comparatively high viscosity of the lubricant. This, too, may be a factor which leads initially to an increased load and therefore to pollutant emission from the internal combustion engine 12. In order to gain a state of lower friction as quickly as possible here, it may be advantageous to heat to an increased extent those system regions which are relevant in this respect. This generally refers to the engine block 30, in which, for example, the pistons move to and fro, at the same time generating a frictional action, and, for example, also to the lubricant sump. By an appropriate design of the second heat transfer region 32 and the increased or even exclusive supply of heated heat transfer medium to the latter in the starting phase, therefore, a state of lower friction can be gained as quickly as possible, which, on account of the lower load on the internal combustion engine, may likewise lead to reduced pollutant emission.

It may be pointed out, further, that, in the temperature control system 10 according to the invention, there may preferably be provision for the various thermally relevant subassemblies, in particular the internal combustion engine 12, to be encapsulated as well as possible thermally, in order to discharge the heat occurring or present there into the surroundings as little as possible and thus to avoid a cooling of these system regions in stationary phases. This encapsulation may be provided by means of suitable insulation materials which may be arranged so as to surround these various system regions.

It may be pointed out, in conclusion, that variations may, of course, be carried out in the temperature control system described above. Thus, for example, it is possible to obtain various flows of the heat transfer region not or not only by the adjustment of various valves, but, for example, also by the controlled cut in or cut out of feed pumps. It also goes without saying that any desired combinations can be obtained by virtue of the variability in cutting in and cutting out various heat-providing or heat-absorbing system regions. Thus, for example, above all in the variant shown in FIG. 2, the engine block 30 alone could also be coupled to the heat exchanger arrangement 16, in order to utilize the heat occurring in the region of the engine block 30 in order to heat the interior. If, taking into account the tribological properties, the heat present in the region of the engine block 30 is also as far as possible to be held there or be utilized for heating the lubricant, then, to heat the air to be introduced into the vehicle interior 18, for example, only the cylinder head 26, that is to say the first heat transfer region 28, may be coupled to the heat exchanger arrangement 16, in order to obtain a corresponding temperature transfer.

The invention claimed is:

1. A vehicle temperature control system, comprising:
an internal combustion engine (12) with an engine block (30) and with a cylinder head (26),
a heat source (14) for heating a heat transfer medium,
a heat exchanger arrangement (16) for the transfer of heat transported in the heat transfer medium to air to be introduced into a vehicle interior (18),
a valve arrangement (20), by means of which the heat transfer medium heated by the heat source can be fed selectively, at least in part, to a first heat transfer region (28), provided in the region of a cylinder head (26), of the internal combustion engine (12), without being conducted into a second heat transfer region (32), provided in the region of the engine block (30), of the internal combustion engine (12),
the heat source (14) comprising a heating appliance preferably operable with fossil fuel and/or a fuel cell system.

2. The vehicle temperature control system as claimed in claim 1, characterized in that the valve arrangement (20) comprises a first valve (22) which is designed for selectively making a flow connection between
the heat source (14) and the heat exchanger arrangement (16) and/or
the heat source (14) and the first heat transfer region (28) and/or the heat exchanger arrangement (16) and the first heat transfer region (28).

3. The vehicle temperature control system as claimed in claim 2, characterized in that the valve arrangement (20) comprises a second valve (24) which is designed for selectively making a flow connection between the first heat transfer region (28) and the second heat transfer region (32).

4. The vehicle temperature control system as claimed in claim 2, characterized in that the first valve (22) is designed for selectively making a flow connection between the second heat transfer region (32) and the heat source (14).

5. The temperature control system as claimed in claim 4, characterized in that the first valve (22) is designed for selectively making a flow connection between
the second heat transfer region (32) and the first heat transfer region (28) and/or
the second heat transfer region (32) and the heat exchanger arrangement (16).

6. The temperature control system as claimed in claim 1, characterized in that the valve arrangement (20) is designed for providing a flow circuit comprising essentially only the first heat transfer region (28) and a feed pump (36).

7. The temperature control system as claimed in claim 1, characterized in that an electrically operable heating device (38, 40) is provided, by means of which heat can be supplied to the heat transfer medium and/or to the air to be introduced into the vehicle interior (18).

8. The temperature control system as claimed in claim 1, characterized in that the valve arrangement (20) is designed to influence, in terms of the flow quantity, at least some of the flow connections capable of being made by this valve arrangement.

9. A method for operating a vehicle temperature control system, said vehicle temperature control system, comprising:
an internal combustion engine (12) with an engine block (30) and with a cylinder head (26),
a heat source (14) for heating a heat transfer medium,
a heat exchanger arrangement (16) for the transfer of heat transported in the heat transfer medium to air to be introduced into a vehicle interior (18),
a valve arrangement (20), by means of which the heat transfer medium heated by the heat source can be fed selectively, at least in part, to a first heat transfer region (28), provided in the region of a cylinder head (26), of the internal combustion engine (12), without being conducted into a second heat transfer region (32), provided in the region of the engine block (30), of the internal combustion engine (12), in which method, in a starting phase of the internal combustion engine (12), the heat source (14) is operated in order to supply heat to the heat transfer medium and, in a first portion of the starting phase, the heat transfer medium heated by the heat source (14) is fed essentially only to the first heat transfer region (28) or the second heat transfer region (32), wherein
when the temperature in the region of the first heat transfer region (28) reaches a first predetermined temperature, in a second portion of the starting phase a flow circuit comprising essentially only the first heat transfer region (28) and a feed pump (36) is formed.

10. The method as claimed in claim 9, characterized in that, when the temperature in the region of the first heat transfer region (28) reaches a second predetermined temperature, in a third portion of the starting phase the second heat transfer region (32) is connected to the flow circuit comprising essentially only the first heat transfer region (28) and the feed pump (36).

11. The method as claimed in claim 10, characterized in that, in the third portion of the starting phase, the heat transfer medium heated in the heat source (14) is fed essentially only to the heat exchanger arrangement (16).

12. The method as claimed in claim 9, characterized in that, in the second portion of the starting phase, the heat transfer medium heated in the heat source (14) is fed to the second heat transfer region (32) and/or the heat exchanger arrangement (16).

13. A vehicle temperature control system, comprising:
an internal combustion engine (12) with an engine block (30) and with a cylinder head (26),
a heat source (14) for heating a heat transfer medium,
a heat exchanger arrangement (16) for the transfer of heat transported in the heat transfer medium to air to be introduced into a vehicle interior (18),
a valve arrangement (20), by means of which the heat transfer medium heated by the heat source can be fed selectively, at least in part, to a first heat transfer region (28), provided in the region of a cylinder head (26), of the internal combustion engine (12), without being conducted into a second heat transfer region (32), provided in the region of the engine block (30), of the internal combustion engine (12),
wherein an electrically operable heating device (38, 40) is provided, by means of which heat can be supplied to the heat transfer medium and/or to the air to be introduced into the vehicle interior (18).

* * * * *